Patented Mar. 1, 1938

2,109,957

UNITED STATES PATENT OFFICE 2,109,957

PREPARATION OF PYRIDINE-CARBOXYLIC ACIDS AND THE LIKE

Miles A. Dahlen and Stanley R. Detrick, Wilmington, Del., assignors to E. I. du Pont de Nemours & Company, Wilmington, Del., a corporation of Delaware No Drawing. Application December 18, 1936, Serial No. 116,648

8 Claims. (Cl. 260—42)

This invention relates to N-heterocyclic carboxylic acids and their salts, more particularly to pyridinecarboxylic acids and more specifically to picolinic acid and its salts, and a process for the manufacture thereof.

It is known that alkyl pyridines may be oxidized to pyridine carboxylic acids by means of alkaline potassium permanganate. It is also known that carboxylic acids having a pyridine structure are formed by the oxidation with potassium permanganate of quinoline, isoquinoline, quinaldines, naphthoquinolines and other condensed ring compounds containing a pyridine structure.

Alpha-picoline has been oxidized to picolinic acid by means of alkaline potassium permanganate in dilute solution at the boiling point or at somewhat lower temperatures for example 65 to 70° C. The alpha-picolinic acid has been isolated by neutralizing the aqueous filtrate from the oxidation to a pH of 7–8, concentrating to a solution of approximately 20% picolinic acid and precipitating with a hot concentrated solution of copper sulfate.

Oxidation in acid solutions with potassium permanganate has, however, not been successful. Thus Delepine-Comptes rendus *184* 206-8 (1927)—found that potassium permanganate in the presence of an equivalent amount of sulfuric acid oxidized alpha-picoline to acetic and formic acids, carbon dioxide and ammonia.

It is an object of this invention to provide a new and improved process for the production of carboxylic acids containing a pyridine structure. Another object is the provision of a new and improved process for the oxidation of alpha-picoline to picolinic acid, whereby higher yields of product are obtained than by means previously described. A further object is the development of methods whereby picolinic acid may be isolated in the form of insoluble salts of high purity. A still further object is the provision of a process for the production of picolinic acid which involves the recovery and re-use of unchanged picoline, thereby further increasing the yields obtained. Other objects will appear hereinafter.

These objects are accomplished by the following invention wherein an alkyl substituted pyridine or quinoline particularly an alkyl pyridine such as alpha-picoline is oxidized, under conditions more fully set forth below, to a pyridine or quinoline carboxylic acid such as picolinic acid by means of sulfuric acid and manganese dioxide. The pyridine carboxylic acid may then be isolated for example as the copper salt.

As described and claimed in copending application Serial No. 116,647 of Biswell and Wirth filed of even date herewith, the manganese dioxide may be added, in the form of a slurry with concentrated sulfuric acid, to molten alpha-picoline sulfate or equivalent sulfate as exemplified below.

In a preferred form of the invention alpha-picoline is added to an optimum amount of concentrated sulfuric acid to make alpha-picoline sulfate. The temperature is raised to a point at which reaction will occur, and $MnO_2$ is added in small portions with good agitation, the temperature being raised carefully, until the reaction is complete. The charge is then cooled and drowned in water. Sufficient soda ash is added to form sodium picolinate, calcium carbonate is added to neutralize the sulfuric acid and lime is added to precipitate the manganese as the hydroxide. The charge is filtered, the cake washed and the filtrate and washing distilled to remove the unoxidized picoline. The picoline is recovered from the distillate by extraction with ether. The residue from the still is adjusted to the optimum pH and a hot concentrated solution of copper sulfate added. The charge is cooled, filtered and the insoluble copper picolinate washed with cold water.

The principles and preferred form of the invention having thus been outlined, the following examples illustrating the process in greater detail are added for clarification of the invention but not in limitation thereof.

Example I

Ninety-three parts (one mol.) of alpha-picoline was added to 305 parts of 96% sulfuric acid. The temperature was maintained at about 70° C. Three hundred parts of manganese dioxide was added, in small portions, of three to four parts every two to three minutes during three hours, the temperature being maintained at 70° C. during the addition and, then carefully raised to 90–100° C. after the addition of the manganese dioxide and maintained thus for five hours. The temperature was then raised to 125–130° C. for another three hours. The charge was cooled to 80–90° C. and poured into 1000–2000 parts of water. Sixty parts of soda ash was added and sufficient calcium carbonate to bring the charge neutral to Congo red paper. Hydrated lime was added until the charge was alkaline to brilliant yellow paper. The charge was agitated for one hour, filtered and the filter cake washed with hot water. The washings and the filtrate were combined and the unoxidized picoline removed by distillation. The picoline was recovered from the distillate by extraction with ether. The residue in the still was adjusted to a pH of 6 to 7, with hydrochloric acid, and a hot concentrated solution of copper sulfate added until no further precipitation of copper picolinate was observed. The charge was cooled to 20–25° C., filtered, and the cake washed with a quantity of water sufficient to displace the mother liquor.

About 78.4 parts of copper picolinate was obtained representing a yield of 51%. Twenty-three and four tenths parts of alpha-picoline was recovered, giving a net yield of 68% of theory.

It will be recognized that while the example describes the isolation of the picolinic acid as a copper salt, which is preferred because of its insolubility and the crystalline nature of the precipitate which is pure and readily filtered and washed, other insoluble salts may be precipitated from the concentrated solution of soluble picolinic acid salts. Among the other insoluble salts which may be precipitated are the magnesium, calcium, cadmium, ferric, barium and tin salts, the precipitating agents being compounds of corresponding metals which are water-soluble.

*Example II*

Ninety-three parts (one mol.) of alpha-picoline was charged into a well stirred reaction vessel. Fifty parts of 100% sulfuric acid was added gradually, the temperature being kept under 80° C. The alpha-picoline-sulfate was heated to about 110° C. and a suspension of 274 parts of manganese dioxide in 402 parts of 100% sulfuric acid added during 3½ to 4½ hours, the temperature of the reaction mass being raised to 130° C., at the start of the MnO2 addition, maintained at 130–140° C. during the addition, then raised to 135–140° C. for 3 to 6 hours longer.

The mass was cooled to 95–100° C. and 100 parts of water was added. The diluted charge was added to about 800 parts of water. Calcium carbonate, (ground limestone) was added, slowly, at 80–90° C. until the charge was neutral to Congo Red paper. The calcium sulfate was removed by filtration and washed thoroughly with hot water. The wash liquor was combined with the strong filtrate and a small amount of sulfuric acid was added to make the solution (containing manganese picolinate and manganese sulfate) slightly acid to Congo Red paper. One hundred parts of CuSO4.5H2O in 150 parts of boiling water was added at 60–80° C., to precipitate the insoluble copper picolinate. The charge was cooled to 20° C. and the copper picolinate removed by filtration. The cake was washed free of manganese sulfate and dried at 60–70° C.

One hundred sixteen to one hundred nineteen parts of copper picolinate (mol. wt. 307.6) of 96–98% purity were obtained. The conversion yield was 73–75% from alpha-picoline (mol. wt. 93).

The above examples represent approximately the optimum conditions for the oxidation of alpha-picoline, according to the present invention. Nevertheless, these conditions may be varied in many ways without sacrificing all the advantages of the new process over the prior art. Among the variations which may be are the following:

1. Other ratios such as 93 parts to 400 parts of alpha-picoline to sulfuric acid may be used.

2. The temperatures and time of reaction given, were found most suitable for the oxidation. However, somewhat lower temperatures, for example 90–100° C. may be used satisfactorily. At lower temperatures, e. g. 90–100° C., the yield was materially decreased.

3. Concentrated sulfuric acid was found to produce the best results. However, lower concentrations, e. g. 80% were used satisfactorily.

Although the foregoing examples illustrate the invention only as it is applied to the alpha-methyl derivative of pyridine, it may be applied to other alkyl pyridines as, for example, compounds having the structure:

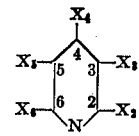

in which at least one of the numbered positions indicated by $X_2$, $X_3$, $X_4$, $X_5$, and $X_6$ is an alkyl radical. Special examples of compounds falling within this general formula are: 3-methylpyridine, 4-methylpyridine, 2:3-dimethylpyridine, 2:4-dimethylpyridine, 2:5-dimethylpyridine, 2:6-dimethylpyridine, 3:4-dimethylpyridine, 3:5-dimethylpyridine, 2-ethylpyridine, symmetrical 2:4:6-trimethylpyridine, 2:3:4-trimethylpyridine, 2-methyl-5-ethylpyridine, 2-methyl-6-ethylpyridine, 3-methyl-4-pyridine, 2-propylpyridine, 2-isopropylpyridine, 4-propylpyridine, 4-isopropylpyridine, butylpyridine and higher alkyl pyridines, the word "alkyl" being used to designate an open chain hydrocarbon radical. Similarly, the invention may be applied to alkyl quinolines, quinaldine, alpha-beta-dimethylquinoline, alpha-gamma-dimethylquinoline, beta-gamma-dimethylquinoline, alpha-ethylquinoline, gamma-propylquinoline, trimethylquinolines, tetra-methylquinolines, tetra-methyldipyridyl, and other condensed ring homologues. From the methylpyridines, the corresponding pyridine carboxylic acids are produced by the oxidation of the alkyl group.

The alkyl pyridines are highly satisfactory initial materials and of these the methylpyridines are preferred because of their ready availability, low cost, lower requirements in manganese dioxide, etc.

The invention provides a method of producing compounds of the character above described in high yields. By the application of the invention, alpha-picoline may be oxidized to picolinic acid with higher yields, considering the high degree of purity, than are obtainable by the methods previously known. Furthermore, insoluble salts of picolinic acid are obtained in good purity. These salts are useful in the preparation of dyes and dye intermediates. The process is especially desirable since it may be operated with satisfactory results on a large scale.

According to the new processes of the present invention, alpha-picoline may be oxidized to picolinic acid, in good yields, by means of manganese dioxide and sulfuric acid. The cost of operating such a process is much lower than that of any of the methods described in the prior art. The picolinic acid may be precipitated as an insoluble metallic salt, which in turn, may be converted to soluble salts, in which form the latter are readily hydrogenated to the salts of piperidine-alpha-carboxylic-acid, as shown in Dahlen and Detrick U. S. 2,009,043.

The products are derivatives of C-alkyl pyridine, i. e., pyridines having an alkyl substituent attached to a nuclear carbon atom.

The above description and examples are intended to be illustrative only. Any modification of or variation therefrom which conforms to the spirit of the invention is intended to be included within the scope of the claims.

We claim:

1. Process of preparing picolinic acid which comprises adding 93 parts of alpha-picoline to 305 parts of 96% sulfuric acid at about 70° C., adding 274 parts of manganese dioxide in small portions over a period of three hours, heating the reaction mixture at 90–100° C. for five hours, then at 125–130° C. for three hours, cooling to 80–90° C., adding to 1000–2000 parts of water, adding sixty parts of soda ash, neutralizing to Congo Red with calcium carbonate, making alkaline to Brilliant Yellow with hydrated lime, filtering, washing, distilling the filtrate and washings, bringing the still residue to a pH of 6 to 7 with hydrochloric acid, then adding a hot concentrated solution of copper sulfate until no further precipitation occurs, filtering, washing and drying the copper picolinate.

2. Process of preparing picolinic acid which comprises heating alpha-picoline, sulfuric acid, and manganese dioxide at 70–100° during eight hours, then at 125–130° during three hours, adding soda in amount at least equivalent to the picolinic acid formed, neutralizing with calcium carbonate, making alkaline to Brilliant Yellow with lime, filtering, washing, distilling the filtrate and washings to remove alpha-picoline and adding copper sulfate to precipitate copper picolinate.

3. Process of preparing picolinic acid which comprises oxidizing alpha-picoline by heating with sulfuric acid and manganese dioxide, adding sodium carbonate in amount at least equivalent to the picolinic acid formed eliminating the sulfuric acid radical by means of calcium carbonate and separating the picolinic acid as copper picolinate.

4. In a process for the preparation of picolinic acid, the step which comprises adding solid manganese dioxide to picoline dissolved in strong sulfuric acid.

5. In a process for the preparation of picolinic acid, the step which comprises heating alpha-picoline with sulfuric acid and manganese dioxide.

6. In a process for the preparation of a pyridine carboxylic acid, the step which comprises heating a C-methyl-pyridine with sulfuric acid and manganese dioxide.

7. In a process for the preparation of a pyridine-carboxylic acid, the step which comprises heating a C-alkyl pyridine with sulfuric acid and manganese dioxide.

8. In a process for the preparation of pyridine-carboxylic acids, the step which comprises heating a member of the group consisting of C-alkyl pyridines, quinoline and C-alkyl quinolines with sulfuric acid and manganese dioxide.

MILES A. DAHLEN.
STANLEY R. DETRICK.